United States Patent Office 2,786,783
Patented Mar. 26, 1957

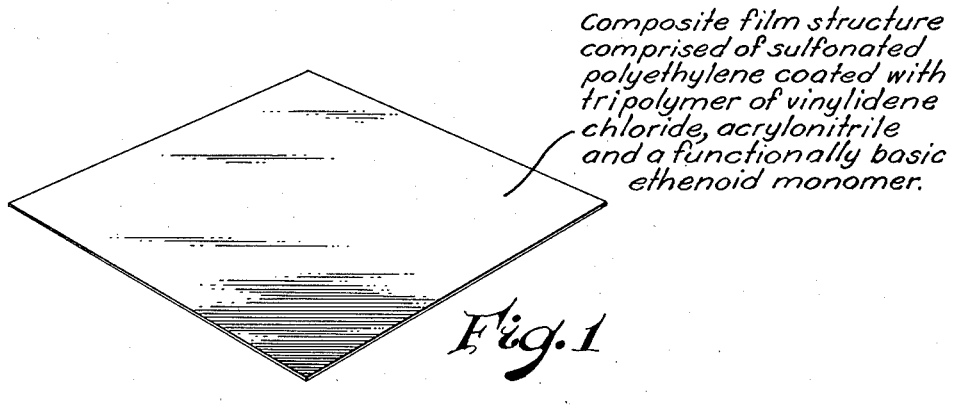
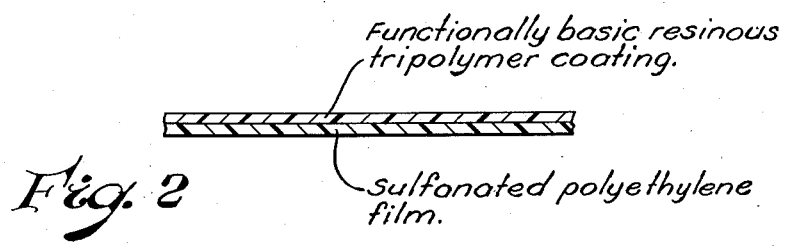
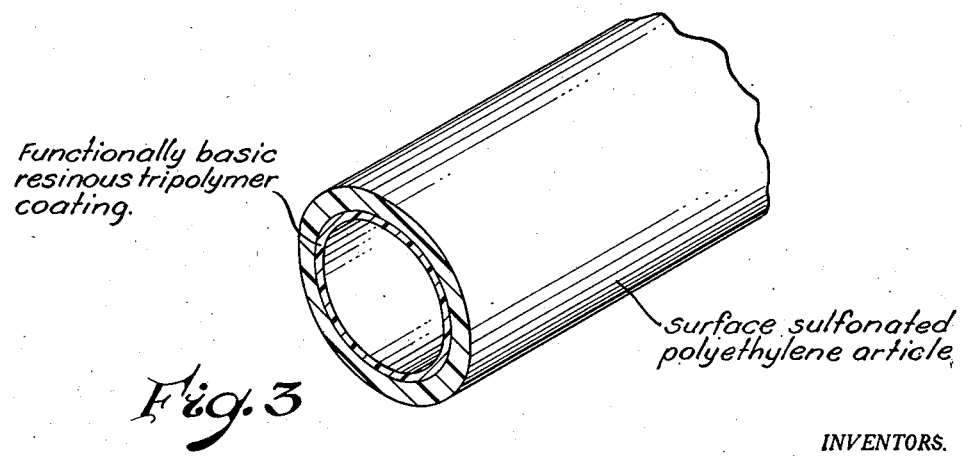

2,786,783

COATING PROCESS FOR POLYETHYLENE AND COMPOSITE ARTICLES THEREBY OBTAINED

Harold G. Hahn and Wilhelm E. Walles, Midland, Mich., assignors to The Dow Chemical Company, Midland, Mich., a corporation of Delaware Application May 25, 1956, Serial No. 587,361

15 Claims. (Cl. 117—72)

This invention relates to a process for coating polyethylene films and other shaped articles with resinous layers comprised of a tripolymer of vinylidene chloride, acrylonitrile and a functionally basic ethenoid monomer. It also has reference to the coated articles, particularly films, which may thereby be obtained.

Films and other shaped and molded articles of polyethylene have many attractive characteristics including, in general, good physical properties and, in particular, excellent behavior and resistance to embrittlement at low temperatures. Despite these attributes, however, shaped articles of polyethylene frequently may not have a satisfactory ability to provide effective barriers against the transmission or permeation of certain gases and vapors, particularly oxygen. Furthermore they do not always have suitable clarity and transparency and are prone to become scuffed and marred on their surface despite their otherwise strong and tough characteristics.

While certain of these shortcomings of polyethylene might be compensated for by coating it with various resinous materials having complemental properties to provide composite articles having more completely satisfactory characteristics, difficulties have been encountered in the derivation of such articles. This is usually because of the inefficient bonding and poor adherance that is experienced when most resinous materials are attempted to be coated on polyethylene surfaces in order to form composite structures. Polyethylene film and other articles, as is well known, commonly have a smooth and sleek, relatively slippery and wax like surface which is poorly adapted to provide for suitable adhesion or anchorage of applied materials by mere physical attachment. Furthermore, the relatively inert chemical nature of polyethylene resists the efficient attachment of most materials by chemical inter-linkage or bonding.

It is among the principal objects of the present invention to provide an efficient and effective method for coating polyethylene films and other articles with tightly adhering integral layers of a resinous tripolymer of vinylidene chloride, acrylonitrile and a functionally basic ethenoid monomer (which is polymerizable while retaining its pendant, basic functional groups available for further combination) so as to provide useful composite structures of polyethylene films and articles and the resinous coatings on the articles which are particularly adapted for employment at relatively low temperatures as flexible materials for packaging and the like that have improved gas and vapor barrier characteristics, better clarity and a more scuff-resistant surface.

According to the invention, polyethylene articles may be effectively provided with a tightly-adhering and firmly anchored coating of a resinous tripolymer of vinylidene chloride, acrylonitrile and a functionally basic ethenoid monomer by a method which comprises sulfonating the surface of the polyethylene article and subsequently applying a layer of the functionally basic resinous tripolymer of vinylidene chloride, acrylonitrile and a functionally basic ethenoid monomer over the sulfonated polyethylene surface.

The composite articles (as illustrated by the composite film which is depicted perspectively in Figure 1 and cross-sectionally in Figure 2 and by the coated tubular article shown perspectively in Figure 3 of the accompanying drawing), which advantageously may be obtained by practice of the invention, possess the desirable and beneficial characteristics of polyethylene while having improved gas and vapor barrier properties, especially to oxygen, greater resistance to scuffing and better clarity. Composite film structures in accordance with the invention, for example, may generally be obtained with only a very slight degree of haziness which is not discernible upon ordinary visual inspection and which has been reduced almost to the vanishing point from the haze that is present in the original polyethylene film. In addition, the applied coating, in most instances, is extremely difficult if not completely impossible to strip from the surface of the sulfonated polyethylene film or other article by ordinary physical methods.

Composite film structures may advantageously be prepared in accordance with the present invention. Such film structures have particular utility as wrapping and packaging materials for foodstuffs and other articles which are intended to be handled or maintained and stored at relatively low temperatures in a refrigerated or frozen condition. Other composite structures including tubes, hose, flexible bottles and other containers such as cartons and boxes may also be made with advantage by practice of the invention.

Advantageously, relatively thin polyethylene films are employed in order to obtain composite film structures according to the invention. Beneficial results, for example, are readily obtainable with films having a thickness which is not greatly in excess of about 20 mils. It is frequently even more beneficial to employ polyethylene films having a thickness between about 0.5 and 5 mils. The polyethylene film which is employed in the practice of the present invention as well as other polyethylene articles may be derived from polyethylene of any nature. The polymers of ethylene which are employed may, for example, be similar to those which sometimes are referred to as "polythenes" and which may be obtained by polymerizing ethylene in a basic aqueous medium and in the presence of polymerization-favoring quantities of oxygen under relatively high pressures in excess of 500 or 1,000 atmospheres at temperatures which may be between 150 and 275° C. Or, if desired, they may be similar to the essentially linear and unbranched polymers which have been referred to as "ultrathenes" and which ordinarily have greater apparent molecular weights (as may be determined from such characteristics as their melt viscosities and the like) in excess of about 40,000; densities of about 0.94–0.96 gram per cubic centimeter; and melting points in the neighborhood of 125–135° C. They are ordinarily found to have a more crystalline nature than conventional polyethylenes and may contain less than 3.0 and even less than 0.3 methyl radicals per 100 methylene groups in the polymer molecule. The essentially linear and unbranched polymers of ethylene may be obtained under relatively low pressures of 1 to 100 atmospheres using such catalysts for polymerizing the ethylene as mixtures of strong reducing agents and compounds of Group IV—B, V—B and VI—B metals of the Periodic System, chromium oxide on silicated alumina, hexavalent molybdenum compounds; and charcoal supported nickel-cobalt.

The surface of the polyethylene may be sulfonated by subjecting it to the action of a sulfonating reagent selected from the group consisting of concentrated sulfuric acid containing at least about 98 percent by weight of $H_2SO_4$, oleum, anhydrous solutions of oleum and free sulfur trioxide. Advantageously, the sulfonated surface may be washed free from excess sulfonating reagent prior to the application of the resinous coating.

While the surface sulfonation of the polyethylene may be accomplished with any of the mentioned sulfonating reagents, it is usually more advantageous to employ oleum (which is sometimes known as fuming sulfuric acid) containing from trace amounts to about 10 percent by weight of dissolved, free sulfur trioxide. If desired, the oleum can also be employed beneficially in anhydrous solutions with other materials such as acetic anhydride and the like which permit effective quantities of the sulfur trioxide to be available in an amount which is equivalent to that which is provided in the oleum. In certain instances, it may be convenient to employ free sulfur trioxide vapors which, beneficially, may be diluted to a concentration as low as 10 percent or less, for example, with a suitable inert gas such as nitrogen.

Generally, a satisfactory degree of surface sulfonation may be obtained when operating at temperatures between the freezing point of the sulfonating reagent and about 150° C. for periods of time ranging from matters of merely several seconds or even almost instantaneous periods which involve mere fractions of seconds to hours. Frequently, when an oleum is employed which contains dissolved, free sulfur trioxide in amounts ranging from traces to about 10 percent by weight, the surface sulfonation may be performed suitably at an operating temperature of about 50° C. within a time period of about five minutes.

The degree of surface sulfonation which is obtained on the polyethylene article predetermines to a great extent the bonding that may be obtained between the polyethylene and the subsequently applied resinous coating. For all practical purposes, it precurses the results which may be realized by practice of the invention. The degree of sulfonation that may be obtained in any particular instance is somewhat interdependent on the nature of the polyethylene and the specific physical form or structure of the polyethylene article that is being treated, the strength or effective sulfur trioxide concentration of the reagent, the operating temperature and the length of the treatment. Care should be taken to avoid sulfonation conditions which may be too drastic, as may occur when an oleum is employed with a relatively high free sulfur trioxide content at too high a temperature or for too long a period of time. Care should also be taken to employ more moderate treating conditions upon more delicate structures such as exceptionally fine films and the like. If such precautions are not assiduously observed, the polyethylene article may be caused to decompose and degrade resulting in its being darkened and discolored to an intolerable extent. Conversely, optimum coating results may not be obtained if overly weak sulfonating conditions are employed which may not sufficiently modify the surface of the polyethylene article to permit a suitably beneficial quantity of the coating to be effectively and permanently applied thereto.

The resinous tripolymer that may be employed for coating the surface of the sulfonated polyethylene may contain between about 40 and 90 percent by weight of vinylidene chloride, between 5 and 60 percent by weight of acrylonitrile, and between 1 and 15 percent by weight of the functionally basic ethenoid monomer polymerized in the tripolymer molecule. Advantageously, it may contain between about 50 and 70 percent by weight of the vinylidene chloride, between 30 and 50 percent by weight of the acrylonitrile and between 6 and 12 percent by weight of the functionally basic ethenoid monomer. The functionally basic ethenoid monomer that is employed, as is apparent, is a material that retains a functional basicity and imparts this characteristic to the resinous tripolymer after being polymerized in the tripolymer molecule. Advantageously, a vinyl pyridine monomer such as 2-vinyl pyridine, 4-vinyl pyridine, 2-methyl-5-vinyl pyridine and the like is employed for this purpose. If desired, however, such functionally basic ethenoid monomers as N-dimethylamino ethyl acrylate, 2-morpholino ethyl acrylate and the like may also be employed with benefit. The functionally basic resinous tripolymer may advantageously be prepared by a suspension polymerization technique using organic peroxy catalysts in accordance with the disclosure contained in the copending application of Marion H. Rector and Harold G. Hahn for a Process for Producing Haloethylenic Polymers Having Enhanced Dye Receptivity, having Serial No. 571,888 which was filed on March 16, 1956, in which the polymerization is conducted in the presence of an acid that is capable of neutralizing the basicity of the pendant basic groups of the functionally basic ethenoid monomers during the polymerization to avoid degradation of the polymer product.

The functionally basic resinous tripolymer may be utilized suitably in several ways in order to obtain a coated layer of the resin on the sulfonated polyethylene film or other article. They may be cast on the sulfonated polyethylene surface from a dissolved composition formulated with suitable solvents, such as in lacquer formulations or they may be deposited with polymerizing mixtures of the monomeric substances which are polymerized in the desired resin. The casting may be accomplished by various spread, dip, brush or spray techniques. After their application, the resinous tripolymer compositions may be dried, cured or treated according to usual and conventional techniques to remove or countereffect solvents, vehicles or other admixed ingredients and to effect a solid deposit of the tightly adhering resinous tripolymer layer in the composite structure.

Advantageously, the casting to form composite film structures may be performed suitably by spread coating a dissolved or laquer formulation of the functionally basic resinous tripolymer over the sulfonated film. While different thicknesses may also be beneficial, it is desirable for the applied layer of the resinous tripolymer on the sulfonated surface of any polyethylene article to be at least about 0.02 mil thick and even more desirable for many applications for it to have a thickness between about 0.1 and 2.0 mils. As is apparent, films may, if desired, be coated on both of their surfaces in accordance with the invention. In a similar manner, all of the coatable surfaces of other articles such as both of the inner and outer surfaces of containers and the like or either surface or any desired portion of a particular surface may, if desired, be provided with the functionally basic resinous tripolymer coating.

Since the application on the sulfonated polyethylene surface of the functionally basic resinous tripolymer containing functionally basic ethenoid monomer polymerized therein has somewhat the aspects of a metathetical reaction, good adhesion may generally be achieved with any method of application. The retention of the applied resinous tripolymer coating by the polyethylene in the practice of the invention is due not only to the physical influences of so-called Van der Waal's forces and the like but also to the bonding ionic attraction that is involved between the functionally basic coating and the sulfonated surface of the polyethylene.

By way of exemplary illustration, a polyethylene film having a thickness of about 1 mil which was of the type known as "Dura-Clear" polyethylene film and which is obtainable from The Harwid Company of Boston, Massachusetts was surface sulfonated by being immersed in a 3 percent oleum (which contains about 3 percent by weight of free sulfur trioxide dissolved in $H_2SO_4$) at a temperature of about 50° C. for about five minutes. After being sulfonated the film was washed thoroughly in water and dried. The sulfonated film was then coated with a functionally basic resinous tripolymer containing about 55 percent by weight of vinylidene chloride, about 35 percent by weight of acrylonitrile and the balance of 2-vinyl pyridine polymerized in the tripolymer molecule. The resinous tripolymer had been prepared by a suspension polymerization method using a lauroyl peroxide catalyst. It was dissolved in acetone to form about a 15 percent by weight solution which was cast on the sulfonated polyethylene film to provide a uniform coating, after removal of solvent by drying, that had a thickness of about 1.0 mil. The applied coating could not be stripped off the film in an adhesion test which consisted of pressing a strip of conventional cellophane tape (such as that which is obtainable under the name "Scotch" adhesive cellophane tape from the Minnesota Mining and Manufacturing Company) on the coated surface and subsequently pulling the tape away. The coated film had good flexibility and did not become embrittled at temperatures as low as −20° C. In addition, its effectiveness as a vapor barrier was improved over that which is characteristic of the uncoated polyethylene film. Further, the coated film had excellent resistance to surface scuffing and was clear and transparent. Its degree of haziness was reduced substantially completely in comparison to that which was present in the original polyethylene film.

Analogous results are obtainable when sulfonated films of essentially linear and unbranched polyethylene and when other surface sulfonated polyethylene articles are coated in accordance with the invention in a manner similar to the foregoing.

It is to be fully understood that the present invention is to be construed and interpreted not by the foregoing didactic description and specification but in the light of what is set forth and defined in the appended claims.

What is claimed is:

1. Method for coating a polyethylene article with a resinous tripolymer of vinylidene chloride, acrylonitrile and a functionally basic ethenoid monomer which comprises sulfonating the surface of the polyethylene and subsequently applying a layer of the resinous tripolymer over the sulfonated surface.

2. In the method of claim 1, sulfonating the surface of the polyethylene by subjecting it to a sulfonating reagent which is selected from the group consisting of concentrated sulfuric acid containing at least about 98 percent by weight of $H_2SO_4$, oleum, anhydrous solutions of oleum and free sulfur trioxide.

3. A method in accordance with the method set forth in claim 2 wherein the sulfonating reagent is comprised of oleum that contains from trace amounts to about 10 percent by weight of dissolved, free sulfur trioxide.

4. A method in accordance with the method set forth in claim 2 wherein the polyethylene is subjected to the sulfonating reagent at a temperature between the freezing point of the reagent and about 150° C.

5. A method in accordance with the method set forth in claim 2 wherein the sulfonating reagent is comprised of oleum that contains from trace amounts to about 10 percent by weight of dissolved, free sulfur trioxide and the polyethylene is subjected to the oleum at a temperature of about 50° C. for about five minutes.

6. A method in accordance with the method set forth in claim 2 and including the step of washing the sulfonated article free from the sulfonating reagent before applying the coating of the resinous tripolymer.

7. The method of claim 1, wherein the polyethylene article is a film having a thickness which is not in excess of about 20 mils.

8. The method of claim 1, wherein the polyethylene article is a film having a thickness which is between about 0.5 and 5 mils.

9. The method of claim 1, wherein the resinous tripolymer contains between about 40 and 90 percent by weight of vinylidene chloride, between about 5 and 60 percent by weight of acrylonitrile and between about 1 and 15 percent by weight of the functionally basic ethenoid monomer polymerized in the tripolymer molecule.

10. The method of claim 1 wherein the layer of the resinous tripolymer which is applied over the sulfonated surface has a thickness of between about 0.1 and 2.0 mils.

11. Composite structure which comprises a surface sulfonated polyethylene article coated with a tightly adhering layer of a resinous tripolymer containing between about 40 and 90 percent by weight of vinylidene chloride, between about 5 and 60 percent by weight of acrylonitrile, and between about 1 and 15 percent by weight of a functionally basic ethenoid monomer polymerized in the tripolymer molecule.

12. A composite structure in accordance with the composite structure claimed in claim 11 wherein the surface sulfonated polyethylene article is a film having a thickness between about 0.5 and 5 mils.

13. The composite structure of claim 11 wherein the tightly adhering layer of the resinous tripolymer has a thickness between about 0.1 and 2.0 mils.

14. The composite structure of claim 11 wherein the functionally basic ethenoid monomer that is polymerized in the tripolymer molecule is a vinyl pyridine.

15. The composite structure of claim 11 wherein the functionally basic ethenoid monomer that is polymerized in the tripolymer molecule is 2-vinyl pyridine.

No references cited.